United States Patent Office 3,105,936
Patented Oct. 1, 1963

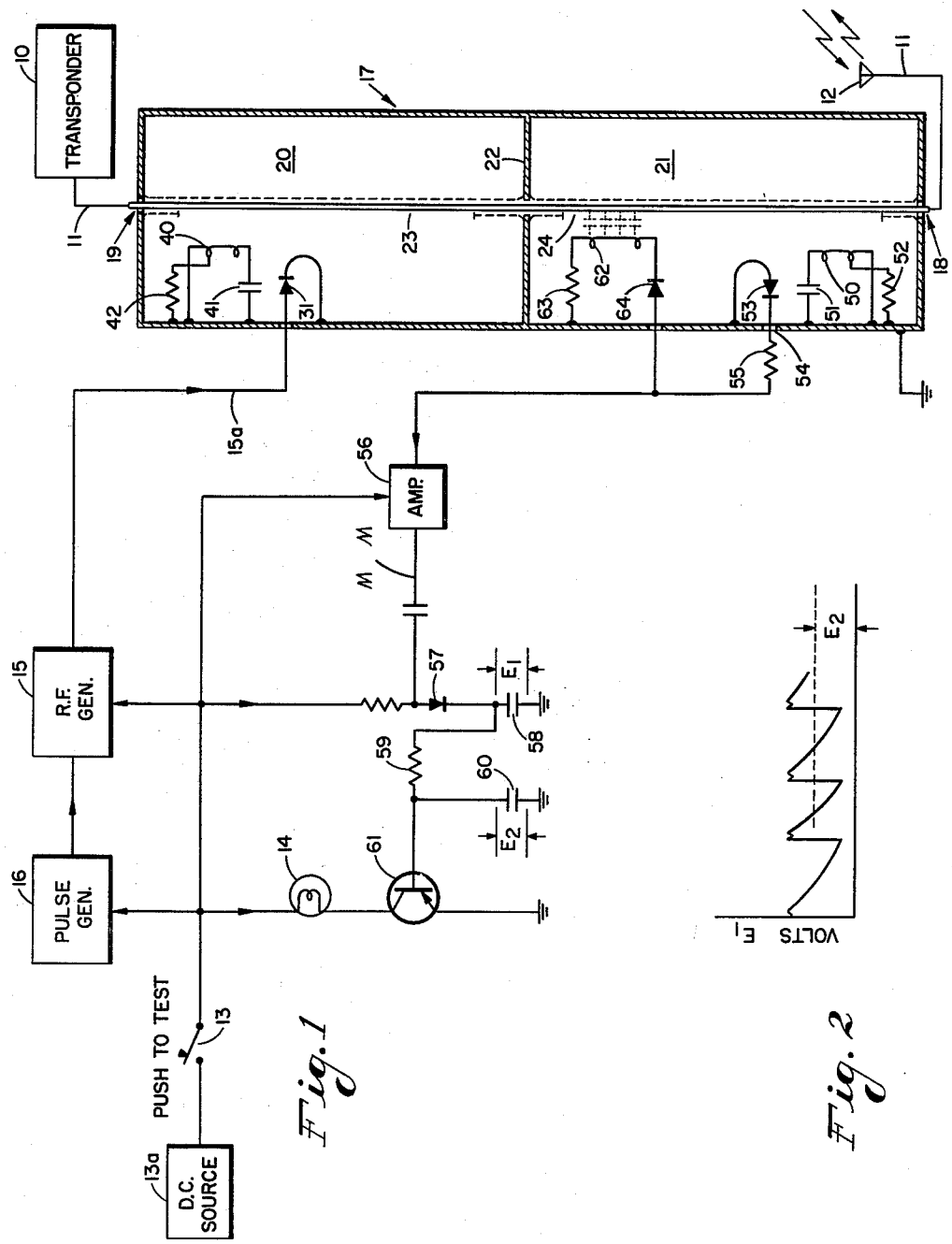

3,105,936
RADIO FREQUENCY COUPLING DEVICE FOR DETECTING ENERGY IN A COAXIAL TRANSMISSION LINE
Richard H. Moehlmann, Rochester, N.Y., assignor to General Dynamics Corporation, Rochester, N.Y., a corporation of Delaware
Filed Apr. 17, 1961, Ser. No. 103,632
3 Claims. (Cl. 324—58)

This invention relates to test equipment and is particularly directed to means for testing high frequency energy flowing in either direction through a transmission line, such as a coaxial transmission line. More specifically, this invention relates to coupling means for injecting radio frequency energy into or extracting radio frequency energy from a coaxial line at a point intermediate its ends without materially disturbing the electrical parameters of the line.

The transmission line to be tested contemplated by this invention may extend between an antenna and radio equipment exemplified by the transponder of ATC (air traffic control) or IFF (identification, friend or foe). To test the transponder, it is desirable to stimulate the transponder with signals having the same characteristics as the signals received by the antenna in actual service in the field. To be a complete and reliable test of the operability of a transponder, the transponder must reply to an interrogating signal with signals of prescribed R.F. frequency, pulse spacing, pulse strength, etc. The reply signals must traverse the one transmission line and be radiated on the antenna on which the interrogating signals are received. Test equipment adapted to interrogate an R.F. transponder and then analyze the reply pulses has heretofore been of laboratory size, weight, and quality, and are unsuited for field or airborne uses.

An object of this invention is to provide improved test equipment for radio frequency gear.

A more specific object of this invention is to provide test equipment for radio gear including a novel T-coupling for connection into the high frequency transmission line of the gear.

A still more specific object of this invention is to provide an improved test equipment for radio gear which is small, light in weight, reliable in operation, and adapted for airborne use.

The objects of this invention are attained by a novel T-coupling for connection in a closed transmission line through which R.F. energy flows in either direction. With the T-coupling of this invention, energy may be injected into and extracted from the line. The T-coupling comprises a housing for enclosing a portion of the transmission line. Where the transmission line is of the coaxial type, an elongated slot is cut in the outer cylindrical conductor of the line, the slot being within the housing and being of sufficient aperture size as to permit the transfer of a limited amount of energy through the slot. A spectrum of high frequency energy containing components of the frequency of operation of the transmission line is provided within the housing. To permit only the components of the frequency of operation to be injected into or removed from the line and to exclude all other frequencies, a resonant circuit comprising a resonant conductor is disposed adjacent to and parallel with the slot. Conveniently, a shield extending transversely across the interior of the housing divides the housing into two compartments in which, respectively, are located the transmitting and receiving components of the coupling device.

Other objects and features of this invention will become apparent to those skilled in the art by referring to the specific embodiments described in the following specification and shown in the accompanying drawings, in which:

FIG. 1 is a block diagram of the test system of this invention with a schematic layout of the T-coupler of the system;

FIG. 2 is a voltage waveform of the received and demodulated signals extracted from the transmission line by the T-coupler of the system of FIG. 1;

Figure 3:
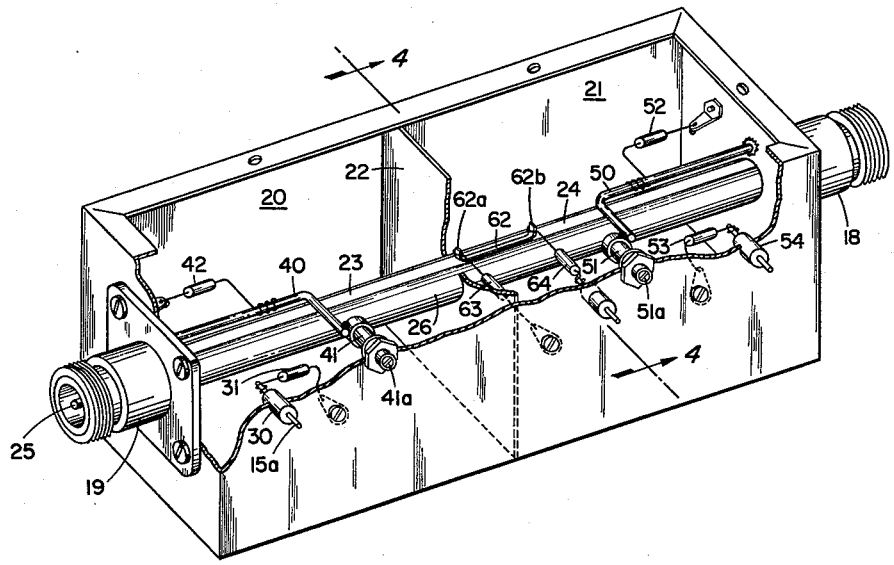
FIG. 3 is a perspective view of one mechanical layout of the T-coupler of the system of FIG. 1.

The particular radio equipment to be tested, according to this invention, comprises the radio transponder 10 coupled through transmission line 11 to antenna 12. In response to interrogating pulse signals received by antenna 12, the transponder generates a like pulse signal or a differently coded pulse signal on the same or different radio frequency carrier and transmits the reply after a delay of a few microseconds to antenna 12. Where the transponder and antenna are airborne and are employed for ATC purposes, for example, it is important, obviously, that the transponder be always operative and responds without fail exactly as required. According to this invention, the operator can at any time test the operability of the transponder by closing the push-to-test switch 13 and observing whether or not the lamp 14 lights.

The switch 13 connects the D.C. power source 13a to the transmitting and receiving circuits of the system. With transistors or fast heating tubes, the lamp responds almost immediately with a go, no-go indication of the system under test when switch 13 is closed. The output of the generator 15 is modulated by the pulse generator 16 with pulse signals preferably coded as to pulse spacing, repetition rate, etc., to correspond to the signals expected to be received by antenna 12. Inasmuch as the R.F. operating frequency of the transponder may be in the 1,000 megacycle range which is a frequency so high as to make difficult the control of leakage radiation and the design of generator 15 costly, it is proposed, according to one feature of this invention, to generate at 15 some relatively low frequency, such as 50 megacycles. As will be explained hereinafter, the generated frequency is stepped up to the operating frequency of the transponder within the T-coupling device comprising housing 17.

Figure 4:
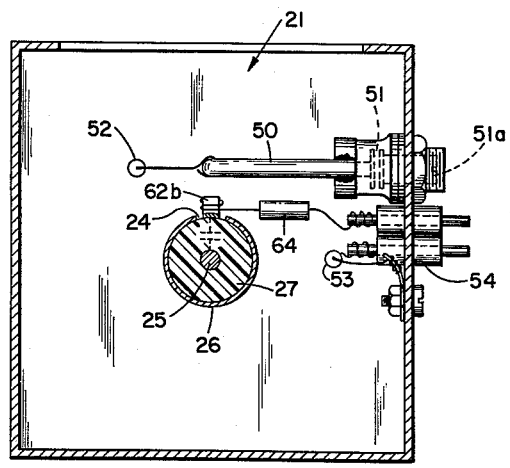
FIG. 4 is a sectional view of the T-coupler of this invention taken on line 4—4 of FIG. 3.

Housing 17 encloses a segment of the transmission line 11 and is insertable into the line by the detachable couplings 18 and 19, better shown in FIG. 3. The transmission line extends centrally through the housing which is divided into two substantially equal compartments 20 and 21 by the transverse partition 22. Elongated slots 23 and 24 are cut in the outer cylindrical conductor of the transmission line. The slots 23 and 24 are along the sides of the cylindrical conductor, are parallel to the axis thereof, and, for convenience, may extend substantially the full length of the compartments. While the width of the slots are not critical, it is preferred that the slots be made only of sufficient width as to permit coupling therethrough of a small portion of the energy within the cylindrical conductor. As shown in FIG. 4, the slot width in one successful embodiment was about 10 percent of the circumferential dimension of the conductor. Further, as shown in FIG. 4, the transmission line is of the coaxial type having the coaxial inner conductor 25 coaxial with the outer cylindrical conductor 26. The dielectric sleeve 27 of commercially obtainable coaxial lines suitable for this invention comprises low loss Teflon.

The output of R.F. generator 15, when switch 13 is closed, is coupled through the conductor 15a in the insulating bushing 30 (see FIG. 3) to the diode 31. Diode 31 is of the semiconductor type and is adapted because of its nonlinear voltage-current characteristic to generate a broad spectrum of frequencies when stimulated by voltages in the nonlinear region. One diode found to be serviceable for this purpose is of the type commercially known as the 1N904. While one lead of the diode is connected to the R.F. generator 15, as stated, the other lead of the diode is grounded directly, as by soldering or welding, to the inner surface of housing 17. The two leads of the diode 31 are spaced apart to provide a loop which will electromagnetically couple the spectrum of frequencies generated by the diode into the compartment space 20. Where the R.F. generator 15 has a frequency of, say, 50 megacycles, the generated spectrum will contain frequency components of 1,000 megacycles.

Assume, now, that it is desired that the 1,000 megacycle components only of the spectrum be admitted to the transmission line 11. For this purpose, the resonant transmission line 40 is provided. Transmission line 40 comprises a single relatively stiff conductor disposed close to and parallel with slot 23. One end of the stiff conductor of line 40 is connected to and mechanically supported by the housing and the other end is coupled to ground through the tuning condenser 41. The two plates of condenser 41 are insulatedly supported in a metal sleeve mounted in the wall of the housing, and the spacing between the plates is externally adjustable to make the conductor 40 resonant to the desired injection frequency. Preferably, one of the two plates of the tuning condenser is movable as by the threaded set-screw 40a. See the corresponding condenser 51 in FIG. 4. Resistor 42 is connected between the housing and an intermediate point on the line 40 to finely adjust the Q and the selectivity of the resonant line.

It has been found that although the compartment space 20 contains a wide band of frequencies, only the one frequency to which line 40 is tuned is effectively coupled to the coaxial line through the slot, all other frequencies being attenuated at least 15 db below the desired frequency. The slot opening and the position of the conductor 40 with respect to the slot and the signal strength are easily adjusted so that the desired frequency stimulates the transponder 10 precisely as if the frequency had been received at antenna 12.

The reply signal, fed from the transponder to the antenna, appears in the slots including slot 24 in compartment 21 and a small portion of the energy of the reply is selectively coupled from the interior of the coaxial line to the interior of compartment 21. It has been found that the coupling through the slots in the coaxial line is bilateral so that incoming and outgoing energy may be equally derived. In compartment 21 is disposed the resonant transmission line 50 tuned by condenser 51, the selectivity of which is adjusted by resistor 52, as in the case of the line 40. Usually the interrogating and reply pulses are of slightly different frequencies, such as 1030 and 1090 megacycles, respectively. The single conductor of the line 50 is disposed close to and parallel with the slot; and when the tuning condenser 51 is properly adjusted by adjusting screw 51a, energy of the operating reply frequency only is extracted from the coaxial line. This energy is in turn picked up by the loop comprising the leads of diode 53, one lead being grounded to the housing and the other lead passing through the housing in insulating bushing 54.

The very high frequency of the pulse signals inductively picked up by the loop of diode 53 are demodulated by the diode and the resulting pulse signals are applied through coupling resistor 55 to amplifier 56. The demodulated pulse signals, which often occur in closely spaced pairs, are, after amplification, rectified by diode 57 to produce a more or less sawtooth voltage $E_1$ across the series-connected condenser 58, as shown in FIG. 2. Preferably, the direct current bias across diode 57 is just below conduction value so that when pulses of the correct polarity are applied to one terminal of the diode, conduction starts, and condenser 58 is charged by the D.C. power source. The integration circuit including resistor 59 and condenser 60 receives the sharply rising and slowly decaying voltage from across condenser 58 to produce average voltage $E_2$ across condenser 60. Voltage $E_2$ is proportional to the average energy of and the spacing between pulse pairs of the received demodulated and amplified signals from the transponder. If this averaged voltage is sufficiently high, transistor 61 conducts and lamp 14 lights. If it is desired to test the transponder for its pulse coding circuits, a pulse decoding circuit, not shown, may be inserted before or after amplifier 56.

To make a reasonably complete test of the transponder 10 and its antenna 12, the operator should be able to determine if the transmitted signal from the transponder is actually being radiated. If the radiation resistance of the antenna 12 is of an improper value, or if the impedance of the antenna load does not match the characteristic impedance of the transmission line feeding the antenna, or if there is a short circuit or open circuit in the line, a discontinuity in the transmission path occurs and abnormal reflections from the antenna end of the line will be produced.

According to another and important feature of this invention, a directional coupler is provided for sensing an abnormal voltage standing wave ratio (VSWR). In this feature, a novel directional coupler is provided for distinguishing between pulse signals traveling in opposite directions along the transmission line 11. The directional coupler, as shown, comprises a metal ribbon 62 narrower than the slot 24 laid in the slot and connected at its transponder-end 62a through the load resistor 63 to ground. The other end of the ribbon, 62b, toward the antenna load, is connected through the diode 64 to the receiver circuits. The diode 64 is conveniently coupled to the junction of the coupling resistor 55 and the amplifier 56. Only substantial pulses of high frequency reflected from the antenna end of the line will produce a voltage across diode 64, pulses from the transponder being effective to produce a voltage across diode 64. If in normal operation, reflections occur from the antenna, for any reason, those reflections are sensed and amplified in amplifier 56. The polarity of the reflection-produced signals applied to the receiver is so chosen as to prevent the normal response of the go, no-go lamp signal.

The improved test equipment of this invention is small, light in weight, reliable in operation, and adapted for airborne use. The equipment requires only that the operator close a switch and observe the go, no-go signal of a signal lamp to test the equipment. Complete testing may thus be effected immediately before the transponder-antenna equipment is placed in practical use. Many modifications may, of course, be made in the specific circuit and mechanical details of this invention wtihout departing from the spirit or scope of the appended claims.

What is claimed is:

1. A system for testing radio gear having a transponder coupled through a coaxial transmission line to an antenna, said system comprising a source of pulsed R.F. energy for interrogating said transponder and a receiver for demodulating and indicating the pulsed R.F. energy of replies from said transponder, a first R.F. coupling means for injecting energy from said source into said transmission line, a second R.F. coupling means for extracting energy from said transmission line to energize said receiver, said first and second coupling means each including a housing enclosing a longitudinal segment of said coaxial line and providing a defined closed space about said line, the outer conductor of said line within each housing having an aperture through which R.F. energy may pass, the conductor of a resonant transmission line resonant to the operating frequency disposed adjacent each aperture to selectively increase the coupling through each aperture for the frequency of operation.

2. A system for testing radio gear having a coaxial transmission line, said system comprising a housing enclosing a portion of said coaxial transmission line, the outer conductor of said line within said housing having an elongated aperture; a diode within said housing, the leads of said diode being spaced apart to form a loop, a source of relatively low frequency energy, said diode being coupled to said source, the voltage of said source being of a value to operate said diode in its nonlinear region to generate a spectrum of frequencies including relatively high frequency components and to couple the spectrum of energy from said loop into the housing space, and means for selectively coupling energy of a predetermined frequency from said spectrum to the inner conductor of said coaxial transmission line, said means comprising a resonant transmission line resonant to said predetermined frequency disposed adjacent said aperture.

3. In combination in a system for testing a transmitter coupled to an antenna load through a coaxial transmission line having an impedance matched to the impedance of said load, an elongated aperture in the outer conductor of said coaxial line, means for detecting a mismatch of line and load impedances comprising a receiver and voltage indicator circuit, and a directional coupler, said directional coupler comprising a metal ribbon disposed in said aperture and insulatedly supported upon the dielectric core of said line, said ribbon being connected to R.F. ground at its transmitter-end and being coupled to said receiving and indicating circuit at its other end to respond only to standing voltage waves received from said antenna load.

References Cited in the file of this patent

UNITED STATES PATENTS

| | | |
|---|---|---|
| 2,496,837 | Woodyard | Feb. 7, 1950 |
| 2,575,799 | Doherty et al. | Nov. 20, 1951 |
| 2,606,974 | Wheeler | Aug. 12, 1952 |
| 2,639,317 | Bennett | May 19, 1953 |
| 2,936,417 | Hedberg | May 10, 1960 |